United States Patent Office 3,102,901
Patented Sept. 3, 1963

3,102,901
PREPARATION OF ESTERS OF CARBOXY-SUB-
STITUTED DIARYLHYDROXYMETHANEPHOS-
PHONIC ACID
Ellis K. Fields, Chicago, Ill., assignor to Standard Oil
Company, Chicago, Ill., a corporation of Indiana
No Drawing. Filed July 24, 1962, Ser. No. 212,139
12 Claims. (Cl. 260—461)

This invention relates to organo phosphorous compounds and particularly to carboxy substituted diaryl hydroxy methane phosphonic acid and esters thereof.

The novel compounds of this invention have the formula

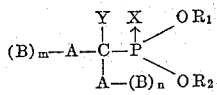

wherein $R_1$ and $R_2$ are each selected from the group consisting of hydrogen, alkyl, cycloalkyl, aryl and aralkyl radicals; A is an aryl radical; B represents —COOR, a substituent on the aromatic nucleus, wherein R is a member of the group consisting of $R_1$ and $R_2$; X is a member of the group consisting of oxygen and sulfur; Y is a member of the group consisting of OH and SH; $m$ is 1 to 5; and $n$ is 0 to 5, where $R_1$ and $R_2$ represent alkyl, cycloalkyl, aryl and cycloaralkyl radicals, such radicals may contain from about 1 to about 22 carbon atoms. These new compounds are useful as pesticides, synthetic lubricants, additives for hydrocarbon fuels and lubricating oils, solvents and plasticizers for resins, and as valuable chemical intermediates.

While the reaction of carbonyl compounds with phosphites in the presence of amine catalysts to yield hydroxy methyl phosphonates is old in the art, the reaction of metal salts of carboxy substituted diaryl ketones with phosphites in the absence of a catalyst did not yield the expected corresponding metal carboxylates of the diaryl hydroxy methyl phosphonates. When metal salts of carboxy substituted diaryl ketones are reacted with phosphites in accordance with this invention, the products obtained are completely esterified with the disappearance of the metal from the compound. For example, the disodium salts of di-(para-carboxy phenyl) hydroxy methane phosphonates are water soluble whereas the compounds of this invention are water insoluble. It was, therefore, extremely unexpected that there was concomitant esterification of the carboxylic groups of the carboxy substituted diaryl ketones with addition of phosphonyl radicals to the carbonyl group of the diaryl ketone.

Briefly, the new compounds of this invention are prepared by reacting a phosphite and a metal salt of a carboxy substituted diaryl ketone in the absence of a catalyst at temperatures within the range of from about 70° to about 150° C., preferably, 90° to 120° C. More specifically, the preparation of these new compounds is effected by reacting a phosphite which is a diester of phosphorous acid or thiophosphorous acid having the formula

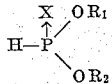

wherein X is either oxygen or sulfur, $R_1$ and $R_2$ are hydrocarbyl radicals containing from 1 to about 22 carbon atoms selected from the group consisting of alkyl, cycloalkyl aryl and aryl alkyl radicals, with a metal salt of a carboxy substituted diaryl ketone or thione having the formula

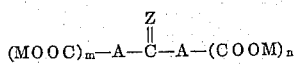

wherein A is a mononuclear or polynuclear carboxy substituted aryl radical, $m$ is 1 to 5 and $n$ is zero to 5, Z is either oxygen or sulfur, and M is a metal of the group consisting of alkali and alkaline earth metals in said phosphite as the reaction medium. While the phosphite functions both as a reactant and as the reaction medium for the preparation of the compounds of this invention, the reaction can be conducted in an inert solvent for the reactants. Consequently, the minimum proportions of phosphite and ketone is such that the phosphite is present in an amount that is at least stoichiometrically proportional to the sum of the carbonyl and carboxyl groups present in the ketone reactant. Preferentially, the reaction is conducted in excess phosphite for the recovery of the reaction products from the reaction mixture is simplified. However, a solvent is required when the phosphites are solid at the reaction temperatures. The time of the reaction, which may vary from 1 to 50 hours, is not critical for the rate of reaction depends upon the temperature and the rate at which the salt solubilizes in the reaction medium.

Illustrative carboxy substituted diaryl ketones and their corresponding thio analogs suitable for use in preparing these new compounds are: 2-carboxy benzophenone, 3-carboxy benzophenone, 4-carboxy benzophenone, 4,4'-dicarboxy benzophenone, 2,4'-dicarboxy benzophenone, 2,2'-dicarboxy benzophenone, 2,3-dicarboxy benzophenone, 3,4-dicarboxy benzophenone, 2,5-dicarboxy benzophenone, 2-carboxy naphthophenone, 2-carboxy-1,2'-naphthylketone, 1-carboxy-2-naphthyl ketone, 1,8-dicarboxy-2-naphthyl ketone, 1,1',8,8'-tetracarboxy-2-naphthyl ketone, 1-carboxy-2-anthryl ketone, and 9-carboxy-2-anthryl ketone. Such diaryl ketones must contain at least one carboxylic group in their structure. However, the aromatic nucleus can also contain other inert substituents.

The phosphite reactants defined above which are organic diesters of phosphorous and thiophosphorous acids (referred to in the specification and claims as phosphites) are exemplified by dimethyl phosphite, diethyl phosphite, dibutyl phosphite, dioctyl phosphite, dioctadecyl phosphite, dicyclohexyl phosphite, dicyclododecyl phosphite, diphenyl phosphite, and dinaphthyl phosphite, diphenanthryl phosphite, dianthryl phosphite, methyl phenyl phosphite, dibenzyl phosphite and diphenethyl phosphite.

Illustrative embodiments of the invention are:

*Example 1*

The disodium salt of 4,4'-dicarboxybenzophenone was prepared by dissolving 27 g. (0.1 mole) 4,4'-dicarboxybenzophenone in a solution of 8 g. (0.2 mole) NaOH in 250 ml. water, evaporating the solution to dryness on the steam bath, and powdering and drying the white solid at 100° C. in a vacuum oven for 18 hours. Springing the free acid from a small portion of the salt showed that it had been unchanged by the heating.

The disodium salt was stirred with 73.5 ml. (0.8 mole) dimethyl phosphite at 90–120° C. for 24 hours. Almost all the solid had gone into solution by the end of 6 hours. The reaction mixture was distilled in vacuo, recovering 34.1 g. (0.31 mole) dimethyl phosphite, boiling at 60–70° C. at 6 mm., $n_D^{20}$ 1.3982. The residue was treated with 400 ml. ether, filtered, and the filtrate chilled to −60° C. The white crystals that came out of solution were collected on a filter, the filtrate was concentrated to about half its volume on the steam bath, and again chilled to −60° C. Two more repetitions of concentrating and chilling of the filtrate to about half its volume each time yielded a total of 17.2 g. (42 mole percent) of crystals that, after crystallization from heptane, melted at 109° C., and was identified as the tetramethyl ester of di-(para-carboxy phenyl) hydroxy methyl phosphonate having the formula

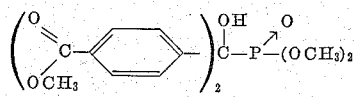

*Analysis.*—Calculated for $C_{19}H_{21}PO_8$: C, 56.0; H, 5.2; P, 7.6; mol. wt., 408. Found: C, 56.1; H, 5.6; P, 7.4; mol. wt., 417±13.

*Example 2*

A mixture of 6.28 g. (0.02 mole) of disodium salt of 4,4'-benzophenone dicarboxylic acid and 39 ml. (0.2 mole) dibutyl phosphite was stirred at 100° C. for 36 hours. Almost all of the solid had gone into solution by this time. The mixture was stirred with 100 ml. water for 15 minutes, the organic layer taken up in 125 ml. ether, the ether solution washed with water, 5% aqueous NaOH, and water, dried over anhydrous $K_2CO_3$, filtered and evaporated on the steam bath, leaving 5.4 g. (48 mole percent) viscous, light tan liquid, $n_D^{20}$ 1.4822, identified as the tetrabutyl ester of di-(para-carboxy phenyl) hydroxy methyl phosphonate having the formula

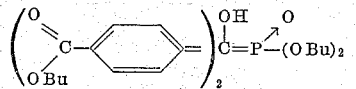

*Analysis.*—Calculated for $C_{31}H_{45}PO_8$; P, 5.4; mol. wt., 576. Found: P, 5.7; mol. wt., 558±13.

The tetrabutyl ester of this example was found to be an excellent solvent for polyvinyl chloride and was a stable, non-volatile plasticizer for polyvinyl chloride polymers.

In the following examples, 4,4'-dicarboxy benzophenone was reacted with dimethyl phosphite in accordance with prior art procedures with or without the use of a basic catalyst such as triethylamine.

*Example 3*

A mixture of 13.5 g. (0.05 mole) 4,4'-dicarboxybenzophenone and 36.8 ml. (0.4 mole) dimethyl phosphite was stirred at 100–110° C. for 24 hours. Very little, if any solid had gone into solution. The cooled mixture was filtered, the solid washed thoroughly with water and dried. It weighed 13.3 g., melted at 380° C. and had a mixed melting point with 4,4'-dicarboxybenzophenone of 380–382°. Thus the benzophenone dicarboxylic acid is non-reactive with dimethyl phosphite.

*Example 4*

The same mixture as in Example 3, plus 0.70 ml. (0.005 mole, 10 mole percent) triethylamine, was heated at 100–110° C. for 24 hours, cooled, filtered, the solid washed thoroughly with water and dried. It weighed 13.4 g., melted at 379–380°, and had a mixed melting point with 4,4' - dicarboxybenzophenone of 379–382°. This example shows that the addition of a basic catalyst in accordance with prior art teachings does not effect the addition of the phosphite to the carbonyl compound.

Examples 3 and 4 illustrate that the diaryl keto carboxylic acids are non-reactive with phosphites, when conducted in accordance with prior art teachings, to produce carboxy substituted diaryl hydroxy methyl phosphonates. It is thus evident that metal salts of such diaryl keto carboxylic acids must be used in order to have any reaction with phosphites and that when such compounds are reacted together, there is a simultaneous addition of phosphonyl radical to the carbonyl group and esterification of the carboxyl groups present in the dialkyl ketone metal carboxylates.

It will thus be apparent to one skilled in the art that this invention provides a simple method for preparing the novel organo phosphorous compounds of this invention which can be simply effected in one-step without the necessity of using a catalyst.

Thus having described the invention, what is claimed is:

1. A method which comprises reacting a phosphite having the formula

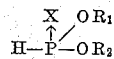

wherein $R_1$ and $R_2$ are each selected from the group consisting of alkyl, cycloalkyl, aryl and aralkyl radicals, and X is a member of the group consisting of oxygen and sulfur, and a metal salt of a carboxy-substituted diaryl ketone, the metal of said salt selected from the group consisting of alkali and alkaline earth metals, and recovering esters of the carboxy-substituted diarylhydroxymethane phosphonic acid thereby produced.

2. The method of claim 1 wherein the reaction is conducted at a temperature in the range of from about 70 to about 150° C.

3. A method of preparing compounds of Formula I (I) 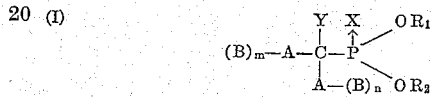

wherein:

(1) $R_1$ and $R_2$ are each selected from the group consisting of alkyl, cycloalkyl, aryl and aralkyl radicals;
(2) A is an aryl radical;
(3) B represents —COOR, a substituent on the aromatic nucleus, wherein R is a member of the group consisting of $R_1$ and $R_2$;
(4) X is a member of the group consisting of oxygen and sulfur;
(5) Y is a member of the group consisting of OH and SH;
(6) $m$ is 1 to 5; and
(7) $n$ is 0 to 5;

which comprises reacting (a) a phosphite of Formula II (II) 

wherein X, $R_1$ and $R_2$ are as defined in Formula I, and (b) a metal salt of a carboxy-substituted diaryl ketone of Formula III (III) 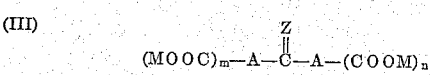

wherein A, $m$ and $n$ are as defined in Formula I, Z is a member of the group consisting of oxygen and sulfur, and M is a metal of the group consisting of alkali and alkaline earth metals; and recovering a compound of Formula I from the reaction mixture.

4. The method of claim 3 wherein the reaction is conducted at a temperature in the range of from about 70 to about 150° C.

5. The method of claim 4 wherein the amount of said phosphite reactant (a) is at least stoichiometrically proportional to the sum of carbonyl and carboxyl groups present in said ketone reactant (b).

6. The method of claim 1 wherein M is an alkali metal.

7. The method of claim 1 wherein M is sodium.

8. The method which comprises reacting (a) a dialkyl phosphite having 1 to 22 carbon atoms in each alkyl group, and (b) the disodium salt of 4,4'-dicarboxy benzophenone at a temperature in the range of about 90 to about 120° C.; and recovering from the reaction mixture a compound having the formula

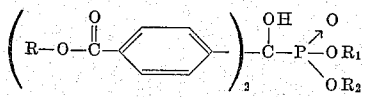

wherein $R_1$ and $R_2$ are each selected from the group consisting of alkyl radicals containing 1 to 22 carbon atoms, and R is a member of the group consisting of $R_1$ and $R_2$.

9. The method of claim 8 wherein said dialkyl phosphite is dimethyl phosphite, and R, $R_1$ and $R_2$ are methyl radicals.

10. The method of claim 8 wherein said dialkyl phosphite is dibutyl phosphite, and R, $R_1$ and $R_2$ are butyl radicals.

11. The method of claim 5 wherein M is an alkali metal.

12. The method of claim 5 wherein M is sodium.

References Cited in the file of this patent

UNITED STATES PATENTS 2,579,810 Fields _____ Dec. 25, 1951